(12) United States Patent
Maruoka et al.

(10) Patent No.: US 7,543,616 B2
(45) Date of Patent: Jun. 9, 2009

(54) HEAVY DUTY TIRE WITH TREAD PORTION HAVING THREE LONGITUDINAL MAIN GROOVES

(75) Inventors: Kiyoto Maruoka, Kobe (JP); Minoru Nishi, Kobe (JP); Atsushi Yamahira, Kobe (JP); Takahiro Kimishima, Kobe (JP); Satoshi Tsuda, Kobe (JP)

(73) Assignee: Sumitomo Rubber Industries, Ltd., Kobe-shi (JP)

( * ) Notice: Subject to any disclaimer, the term of this patent is extended or adjusted under 35 U.S.C. 154(b) by 176 days.

(21) Appl. No.: 10/495,192

(22) PCT Filed: Dec. 13, 2002

(86) PCT No.: PCT/JP02/13110

§ 371 (c)(1),
(2), (4) Date: May 11, 2004

(87) PCT Pub. No.: WO03/059654

PCT Pub. Date: Jul. 24, 2003

(65) Prior Publication Data

US 2005/0000613 A1   Jan. 6, 2005

(30) Foreign Application Priority Data

Jan. 16, 2002 (JP) ............................. 2002-007693
Jan. 16, 2002 (JP) ............................. 2002-007694

(51) Int. Cl.
*B60C 3/04* (2006.01)
*B60C 9/18* (2006.01)
*B60C 11/00* (2006.01)

(52) U.S. Cl. .............................. 152/209.1; 152/209.14; 152/209.18; 152/454; 152/526; 152/538

(58) Field of Classification Search ............ 152/209.14, 152/454, 526, 538, 209.1, 209.18
See application file for complete search history.

(56) References Cited

U.S. PATENT DOCUMENTS 4,446,901 A * 5/1984 Endo et al. .................. 152/900
5,012,847 A * 5/1991 Fukumoto et al. ...... 152/209.18
5,131,446 A * 7/1992 Fukumoto et al. ........... 152/454

(Continued)

FOREIGN PATENT DOCUMENTS

| EP | 323519 | * | 7/1989 |
| EP | 1 024 032 A2 | | 8/2000 |
| JP | 5-77608 A | | 3/1993 |
| JP | 5-77609 A | | 3/1993 |

(Continued)

*Primary Examiner*—Steven D Maki
(74) *Attorney, Agent, or Firm*—Birch, Stewart, Kolasch & Birch, LLP (57) ABSTRACT

A heavy duty tire has a tread portion 2 which is divided into five inner, intermediate and outer rib-like land portions R1, R2, R2, R3 and R3. The inner rib-like land portion R1 is virtually divided into half regions R1$a$ and R1$a$ on each side of a tire equator. The intermediate rib-like land portions R2 and R3 are virtually divided into tire equator-side half regions R2$c$ and R3$c$, and into ground-contact edge-side half regions R2$e$ and R3$e$. In a regular ground-contact state in which a normal load is applied, when total sums of ground-contact load applied to the half regions R1$a$, R2$c$, R2$e$, R3$c$ and R3$e$ are defined as P1$a$, P2$c$, P2$e$, P3$c$ and P3$e$,
P2$c$/P1$a$ is set to 0.9 to 1.05,
P2$e$/P2$c$ is set to 0.75 to 1.0,
P3$c$/P2$e$ is set to 0.9 to 1.2, and
P3$e$/P3$c$ is set to 0.8 to 1.1.

1 Claim, 7 Drawing Sheets

U.S. PATENT DOCUMENTS

| | | |
|---|---|---|
| 5,394,915 A | 3/1995 | Takada |
| 5,647,925 A * | 7/1997 | Sumiya et al. ......... 152/209.14 |
| 5,660,652 A * | 8/1997 | Young et al. ........... 152/209.14 |
| 6,880,599 B2 * | 4/2005 | Maruoka et al. ............ 152/454 |
| 2001/0003998 A1 | 6/2001 | Tuda et al. |
| 2002/0124928 A1 * | 9/2002 | Carra et al. ................. 152/523 |
| 2004/0112492 A1 * | 6/2004 | Kotanides, Jr. ........... 152/209.1 |
| 2005/0016656 A1 * | 1/2005 | Kuroki et al. ............... 152/548 |

FOREIGN PATENT DOCUMENTS

| | | | |
|---|---|---|---|
| JP | 7-164823 A | | 6/1995 |
| JP | 11-245622 | * | 9/1999 |
| JP | 2000-142030 | * | 5/2000 |
| WO | WO 97/07996 | * | 3/1997 |
| WO | WO 98/58810 | * | 12/1998 |
| WO | WO 00/56559 | * | 9/2000 |

\* cited by examiner

PRIOR ART

US 7,543,616 B2

HEAVY DUTY TIRE WITH TREAD PORTION HAVING THREE LONGITUDINAL MAIN GROOVES

TECHNICAL FIELD

The present invention relates to a heavy duty tire for suppressing uneven wear and equalizing wear by specifying a distribution of a total sum of ground-contact force.

BACKGROUND TECHNIQUE

Figure 7:
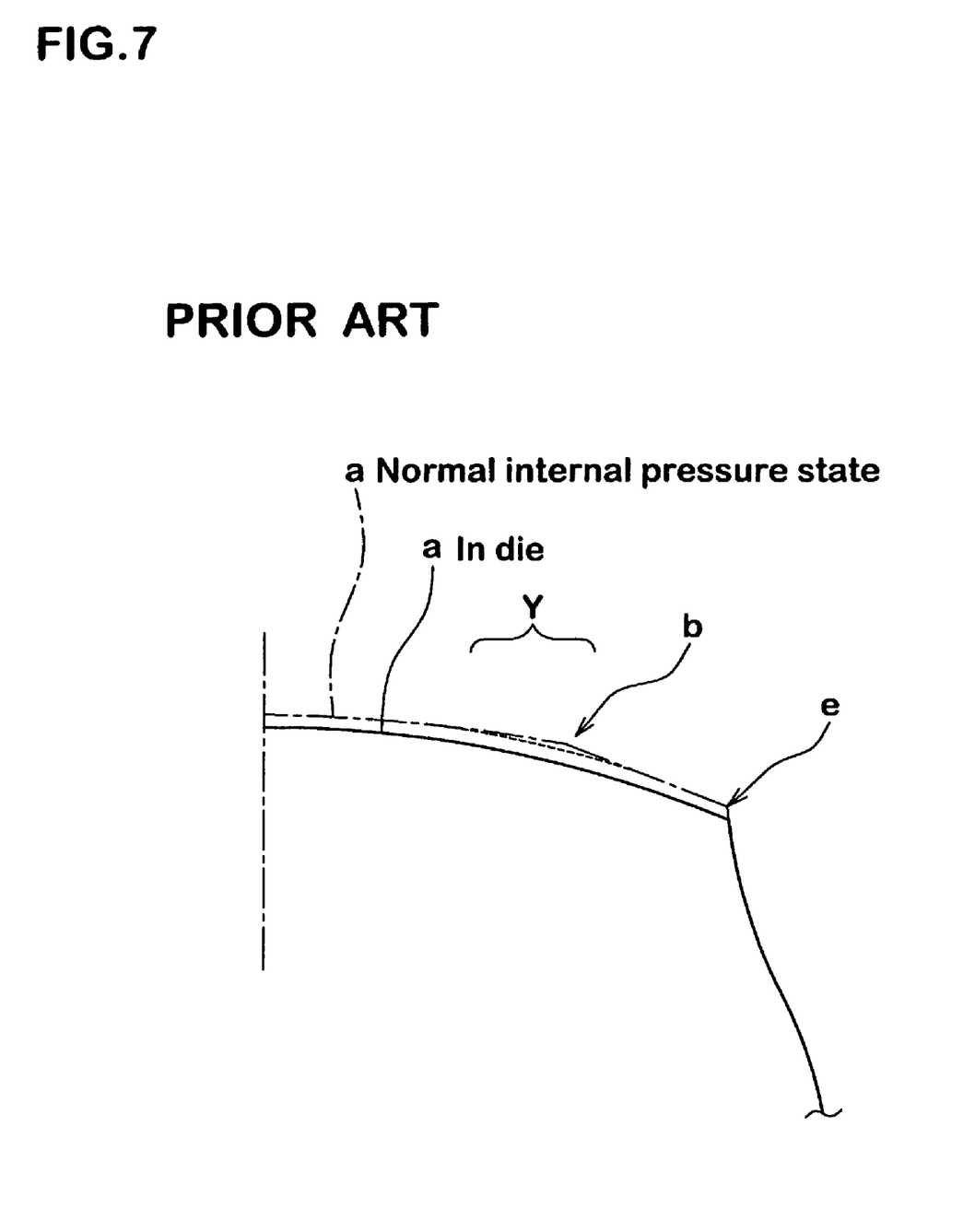
FIG. 7 is a diagram showing a tread profile shape in a conventional tire.

In the case of a heavy duty tire for example, generally, its tread profile shape (a) is formed into a single arc shape in a vulcanization die as schematically shown in FIG. 7.

In a regular internal pressure state in which such a tire is mounted on a regular rim and a regular internal pressure is charged into the tire, however, there is a tendency that a tread surface swells radially outward in a region Y separated from a tire equator by a distance which is 0.5 to 0.7 times a half of a ground-contact width of the tread. Therefore, a circumferential length difference between the swelling portion (b) and the tread ground-contact edge (e) becomes great, a slip is generated between the tread surface on the side of the tread ground-contact edge and a road surface, and uneven wear such as so-called unbalanced wear is prone to be generated.

Hence, in order to suppress the unbalanced wear, as disclosed in Japanese Patent Application Laid-open No. H7-164823, in a tread profile shape, it is proposed that a tread ground-contact edge portion (so-called tread shoulder portion) is formed of a flat arc having a great radius of curvature as compared with a tire equator portion (so-called tread center portion), and a ground-contact length in a ground-contact surface shape of the tread shoulder portion is elongated.

According to this technique, however, rubber gauge thickness in the tread shoulder portion is increased, and excessive increase in the radius of curvature brings about disadvantage because accumulated heat rises a temperature and a belt end is peeled off. From this point of view, there is a limit for increasing the radius of curvature and a suppressing effect of unbalanced wear can not sufficiently be exhibited.

The present inventor focused attention on a relation between the ground-contact force and the uneven wear and studied the relation. As a result, the inventor found that a correlation between the ground-contact force and wear energy was strong, and if the distribution of the ground-contact force was specified, it was possible to suppress the uneven wear including the unbalanced wear and to equalize the wear without excessively increasing the rubber gauge thickness.

That is, it is an object of the present invention to provide a heavy duty tire capable of suppressing the uneven wear including the unbalanced wear and equalizing the wear without excessively increasing the rubber gauge thickness.

DISCLOSURE OF THE INVENTION

To achieve the above object, in a heavy duty tire comprising a carcass extending from a tread portion to a bead core of a bead portion through a sidewall portion, and a belt layer disposed inside the tread portion and outside the carcass, the tread portion is divided by three or four longitudinal main grooves extending in a circumferential direction of the tire into four or five rib-like land portions, the present invention is characterized in that when a normal load is applied to a tire in its normal ground-contact state in which a regular rim is assembled into the tire and a regular internal pressure is charged into the tire, in a total sum of ground-contact force applied to a tire equator side half region and a ground-contact edge side half region, each of which being a rib-like land portion, a ratio of a total sum of the ground-contact force between the axially adjacent half regions is limited to the following predetermined ranges.

That is, in a heavy duty tire in which the tread portion is divided into five rib-like land portions, i.e., an inner rib-like land portion R1 on a tire equator, ground-contact edge-side outer rib-like land portions R3, and intermediate rib-like land portions R2, a first invention is characterized in that a ratio $P2c/P1a$ between a total sum $P1a$ of ground-contact force applied to a half region $R1a$ obtained by dividing an inner rib-like land portion R1 by the tire equator and a total sum $P2c$ of ground-contact force applied to a tire equator side half region $R2c$ in the intermediate rib-like land portion R2 is set in a range of 0.9 to 1.05, a ratio $P2e/P2c$ between the total sum $P2c$ of the ground-contact force and a total sum $P2e$ of ground-contact force applied to a ground-contact edge side half region $R2e$ in the intermediate rib-like land portion R2 is set in a range of 0.75 to 1.0, a ratio $P3c/P2e$ between the total sum $P2e$ of the ground-contact force and a total sum $P3c$ of ground-contact force applied to a tire equator side half region $R3c$ in the outer rib-like land portion R3 is set in a range of 0.9 to 1.2, and a ratio $P3e/P3c$ between the total sum $P3c$ of the ground-contact force and a total sum $P3e$ of ground-contact force applied to a ground-contact edge side half region $R3e$ in the outer rib-like land portion R3 is set in a range of 0.8 to 1.1.

In a heavy duty tire in which a tread portion is divided into four rib-like land portions J, i.e., inner rib-like land portions J1 on each side of a tire equator and ground-contact edge-side outer rib-like land portions J2, a second invention is characterized in that a ratio $P1e/P1c$ between a total sum $P1c$ of ground-contact force applied to a tire equator-side half region $J1c$ in the inner rib-like land portion J1 and a total sum $P1e$ of ground-contact force applied to a ground-contact edge-side half region $J1e$ is set in a range of 0.8 to 1.0, a ratio $P2c/P1e$ between the total sum $P1e$ of the ground-contact force and a total sum $P2c$ of ground-contact force applied to a tire equator side half region $J2c$ in the outer rib-like land portion J2 is set in a range of 0.8 to 1.0, and a ratio $P2e/P2c$ between the total sum $P2c$ of the ground-contact force and a total sum $P2e$ of ground-contact force applied to a ground-contact edge side half region $J2e$ in the outer rib-like land portion J2 is set in a range of 0.6 to 1.0.

In this specification, the "regular rim" is a rim determined for each tire according to a standard on which the tire is based among standards for tires, and for example, in JATMA, when a narrower rim width than the standard rim is set, the regular rim for the tire is a "rim having a rim width which is narrower than the standard rim by one rank", and when no narrower rim width than the standard rim is set, the regular rim for the tire is a "standard rim", in TRA, when a narrower rim width than the "Design Rim" is set, the regular rim for the tire is a "rim having narrower width than the "Design Rim" by one rank", and when no narrower rim width than the "Design Rim" is set, the regular rim for the tire is the "Design Rim", and in ETRTO, when a rim width narrower than the "Measuring Rim" is set, the regular rim for the tire is a "rim having narrower width than the "Measuring Rim" by one rank", and when no narrower rim than the "Measuring Rim" is set, the regular rim for the tire is the "Measuring Rim".

Further, the "regular internal pressure" means an air pressure determined for each tire according to a standard on which the tire of the present invention is based among standards for tires. The regular internal pressure means a maximum air pressure in the case of JATMA, the regular internal pressure means a maximum value described in "TIRE LOAD LIMITS AT VARIOUS COLD INFLATION PRESSURES" in the case of TRA, and the regular internal pressure means a "INFLATION PRESSURE" in the case of ETRTO, but when the tire is for a passenger vehicle, the regular internal pressure is 180 kPa. The "normal load" means a load determined for each tire according to a standard on which the tire of the present invention is based among standards for tires. The normal load is a maximum load capacity in the case of the JATMA, and the normal load means a maximum value described in the Table "TIRE LOAD LIMITS AT VARIOUS COLD INFLATION PRESSURES" in the case of TRA, and the normal load means "LOAD CAPACITY" in the case of ETRTO.

In this specification, the "ground-contact edge" is an outer edge in the tire axial direction of the tread ground-contact surface which comes into contact with the ground when the normal load is applied to the tire in the regular internal pressure state in which the normal rim is assembled to the tire and the regular internal pressure is charged into the tire. A distance between the outer edge (ground-contact edge) and the tire equator is called half of the ground-contact width of the tread.

BEST MODE FOR CARRYING OUT THE INVENTION

Figure 1:
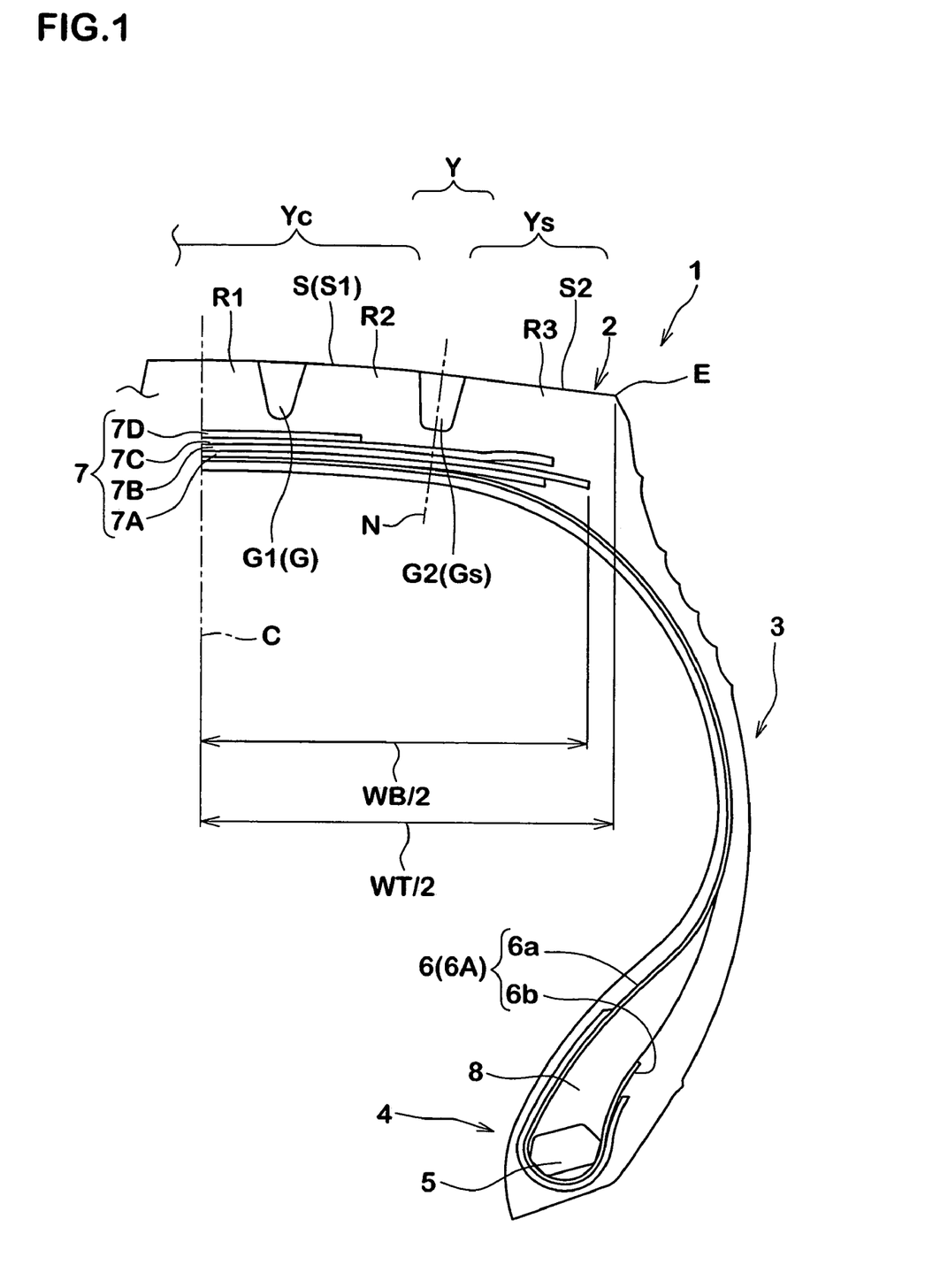
FIG. 1 is a sectional view of a tire of an embodiment of the present invention.

Embodiments of the present invention will be explained below together with illustrated examples. FIG. 1 is a sectional view of a heavy duty tire of the invention for a truck, a bus and the like.

In FIG. 1, a heavy duty tire 1 comprises a carcass 6 extending from a tread portion 2 to a bead core 5 of a bead portion 4 through a sidewall portion 3, and a belt layer 7 disposed inside the tread portion 2 and outside the carcass 6.

The carcass 6 comprises one or more (one, in this example) carcass ply 6A in which a carcass cord is arranged at an angle of 70 to 90° with respect to a circumferential direction of the tire. A metal cord such as steel is used as the carcass cord.

The carcass ply 6A has a ply body 6a extending between the bead cores 5 and 5. The ply body 6a is provided at its opposite sides with turnup portions 6b which are secured after being turned up from inner side toward outer side around the bead core 5. A bead apex rubber 8 extending radially outward from the bead core 5 is disposed between the ply body 6a and the turnup portion 6b. The bead apex rubber 8 reinforces a portion of the tire from the bead portion 4 to the sidewall portion 3.

The belt layer 7 comprises three or more belt plies using metal cords as belt cords. In this example, the belt layer 7 comprises four belt plies, i.e., a first belt ply 7A in which a steel cord is arranged radially innermost side at an angle of 60±15° for example with respect to the circumferential direction of the tire, and second to fourth belt plies 7B, 7C and 7D in which steel cords are arranged at a small angle of 10 to 35° for example with respect to the circumferential direction of the tire.

In the belt layer 7, a ply width of the first belt ply 7A in the axial direction of the tire is smaller than a ply width of the second belt ply 7B and is substantially equal to a ply width of the third belt ply 7C. A ply width WB of the second belt ply 7B having the greatest width is 0.80 to 0.95 times a tread ground-contact width WT, thereby reinforcing substantially the entire width of the tread portion 2 while providing a hoop effect and enhancing the rigidity of the tread. The fourth belt ply 7D having the narrowest width functions as a breaker which protects the first to third belt plies 7A to 7D and the carcass 6 from damage.

Figure 2:
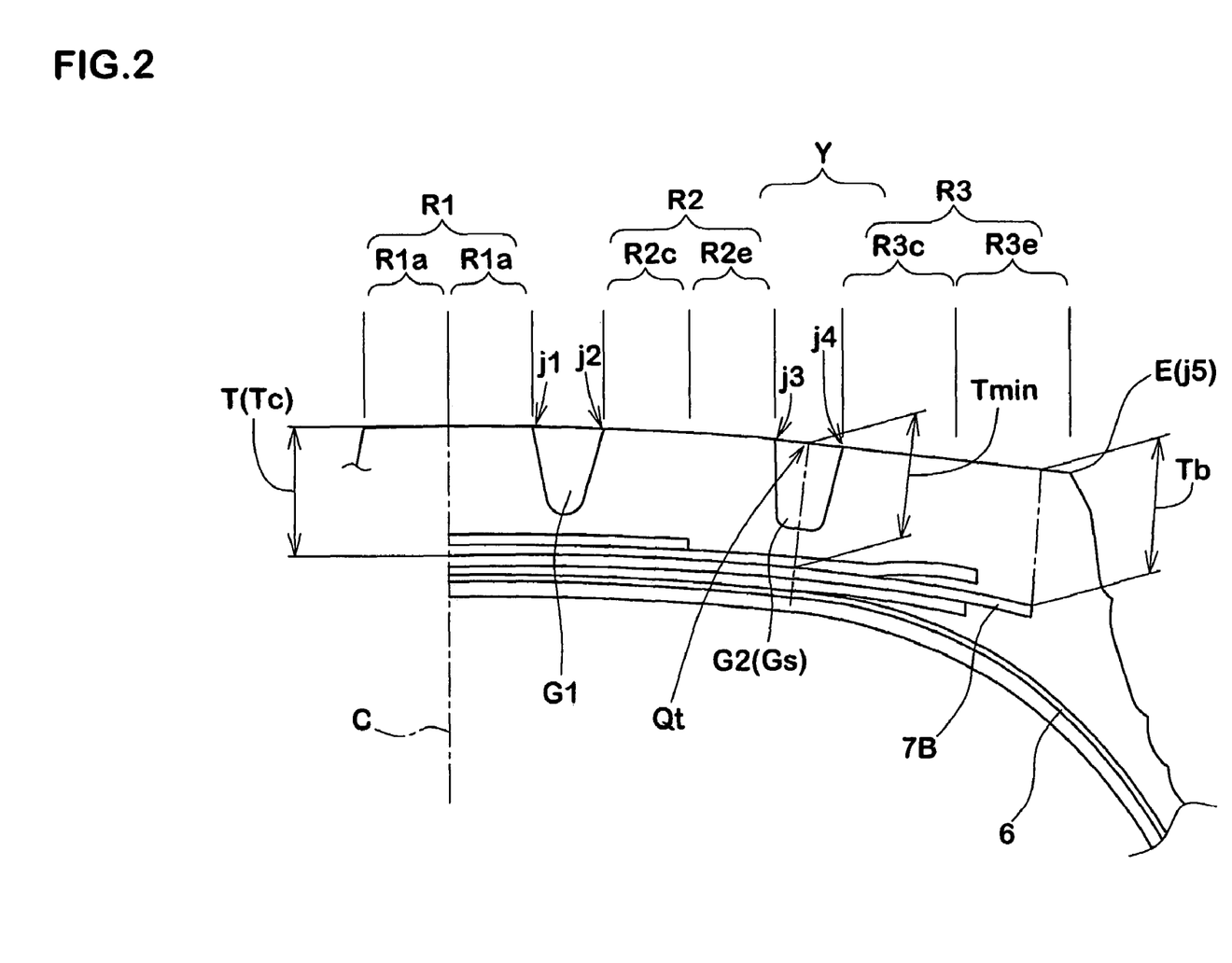
FIG. 2 is an enlarged sectional view of a tread portion of a tire of a first invention.

Next, the tread portion 2 of the heavy duty tire 1 of the first invention comprises four longitudinal main grooves G, i.e., inner longitudinal main grooves G1 extending on opposite sides of the tire equator C and outer longitudinal main grooves G2 extending outer sides of the longitudinal main grooves G1. With this structure, a tread surface is divided into five rib-like land portions R, i.e., a rib-like land portion R1 located at an inner side on the tire equator C, rib-like land portions R3 located at outer sides of the ground-contact edge E, and rib-like land portions R2 located between the rib-like land portions R1 and R3. The rib-like land portions R may be block rows or a rib.

Each of the longitudinal main grooves G1 and G2 has a groove width of 3 mm or more. The longitudinal main groove G is straight or zigzag (including corrugate) in shape and extends in the circumferential direction. It is preferable that the groove width of each of the longitudinal main grooves G1 and G2 is 5 mm or more, and more preferably in a range of 7 to 10 mm. It is preferable that a groove depth is 9 mm or more, and more preferably in a range of 14.5 to 17.5 mm.

In this example, a groove center line N of the outer longitudinal main groove G2, i.e., the shoulder groove Gs located at the outermost side in the axial direction of the tire, passes through a region Y which is separated from the tire equator C by a distance of 0.5 to 0.7 times the half of the ground-contact width of the tread WT/2. With this design, the tread portion 2 is divided into a tread center portion Yc located on an inner side of the shoulder groove Gs and a tread shoulder portion Ys located on an outer side of the shoulder groove Gs. The inner and intermediate rib-like land portions R1 and R2 are disposed in the tread center portion Yc, and the outer rib-like land portion R3 is disposed in the tread shoulder portion Ys. When the shoulder groove Gs is a zigzag groove, a center of the zigzag amplitude is the groove center line N.

In the heavy duty tire 1 of the first invention, in order to suppress the uneven wear in the tread pattern of each of the five ribs, and to equalize the wear, a normal rim is assembled to the tire 1 and a regular internal pressure is charged into the tire. A normal load is applied to the tire in the regular internal pressure state and the tire is brought into a normal ground-contact state. The ground-contact force in this state is specified as follows:

As shown in FIG. 2 in detail, when the rib-like land portion R1 is virtually divided into half regions R1a and R1a on each side of the tire equator C, and the intermediate and outer rib-like land portions R2 and R3 are virtually divided into tire equator side half regions R2c and R3c and ground-contact edge side half regions R2e and R3e, 1) a ratio P2c/P1a between a total sum P1a of ground-contact force applied to the half region R1a of the rib-like land portion R1 and a total sum P2c of ground-contact force applied to the tire equator side half region R2c in the intermediate R2 is set in a range of 0.9 to 1.05, 2) a ratio P2e/P2c between the total sum P2c of the ground-contact force and a total sum P2e of the ground-contact force applied to the ground-contact edge side half region R2e in the rib-like land portion R2 is set in a range of 0.75 to 1.0, 3) a ratio P3c/P2e between the total sum P2e of the ground-contact force and a total sum P3c of the ground-contact force applied to the tire equator side half region R3c in the outer rib-like land portion R3 is set in a range of 0.9 to 1.2, and 4) a ratio P3e/P3c between the total sum P3c of the ground-contact force and a total sum P3e of the ground-contact force applied to the ground-contact edge side half region R3e in the outer rib-like land portion R3 is set in a range of 0.8 to 1.1.

Each total sum P1a, P2c, P2e, P3c and P3e of the ground-contact force can be obtained in the following manner. That is, the tire 1 to which the normal load is applied is brought into contact with a sheet body on which a large number of sensors are spread, and a load applied to each the sensor is measured. Outputs of the sensors with which the half regions contacted are summed for every half region, and it is possible to obtain the total sum of the ground-contact force applied to the half regions R1a to R3e.

Here, the present inventor found that the total sum of the ground-contact force has a strong correlation with respect to the wear energy, and if the total sum P1a to P3e of the ground-contact force applied to the half regions R1a to R3e fall within the ranges 1) to 4), the uneven wear including the unbalanced wear could be suppressed and the wear could be equalized.

Especially in the 1) to 3), if the ratios are out of the above ranges, balance of wear energies between the half regions R1a to R3e is lost, and there is a tendency that orbital wear or punching wear is generated. In the 4), if the ratio P3e/P3c is out of the range of 0.8 to 1.1, there is a tendency that the unbalanced wear is generated.

From a view point of equalization of wear in the entire tread portion 2, it is preferable that the ratio P3e/P1a between the total sum P1a of the ground-contact force and the total sum P3e of the ground-contact force is set in a range of 0.75 to 1.0.

Next, in order to obtain the distribution of the total sum of the ground-contact force, in this example, when a tread thickness between the second belt ply 7B and the profile line S (tread profile line S, hereinafter) of the tread surface in the regular internal pressure state as shown in FIG. 2,

- a smallest tread thickness position Qt where the tread thickness T becomes a minimum value Tmin is provided in the region Y,
- the minimum value Tmin is set to 0.89 to 0.97 times the tread thickness Tc at the tire equator C, and
- a tread thickness Tb of the second belt ply 7B at the outer end position is set to 0.95 to 1.10 times the tread thickness Tc.

At that time, it is preferable that the tread thickness T is gradually increased from the smallest tread thickness position Qt axially inward of the tire to the tread thickness Tc, and axially outward of the tire to the tread thickness Tb.

By employing such a distribution of the tread thickness T, it is possible to obtain the distribution of the total sum of the ground-contact force. With this feature, the tread thickness Tb becomes equal to or less than 1.10×Tc, increase in the rubber gauge thickness in the tread shoulder portion Ys can be suppressed, the separation of the end of the belt by the heat of rubber can be prevented, and high endurance can also be ensured.

In this example, in order to obtain the distribution of the tread thickness T, as shown in FIG. 1, the second belt ply 7B is formed of a single arc whose center is on the tire equator C, the tread profile line S in the tread center portion.Yc is formed of a projecting arc profile line S1 using a single arc or a plurality of arcs, and the tread profile line S in the tread shoulder portion Ye is formed of a substantially straight profile line S2.

Next, a heavy duty tire 1 of a second invention will be explained based on FIG. 3.

The tread portion 2 of the heavy duty tire 1 of the second invention comprises three longitudinal main grooves G, i.e., a central longitudinal main groove G1 extending on the tire equator C, and two outer longitudinal main grooves G2 extending on each side of the longitudinal main groove G1. With this structure, the tread surface is divided into four rib-like land portions J, i.e., inner rib-like land portions J1 on each side of the tire equator C, and outside rib-like land portions J2 on the ground-contact edge E side. The rib-like land portions J may be block rows or a rib, like the rib-like land portions R. The shoulder groove Gs which is the outer longitudinal main groove G2 is formed in the region Y.

Figure 3:
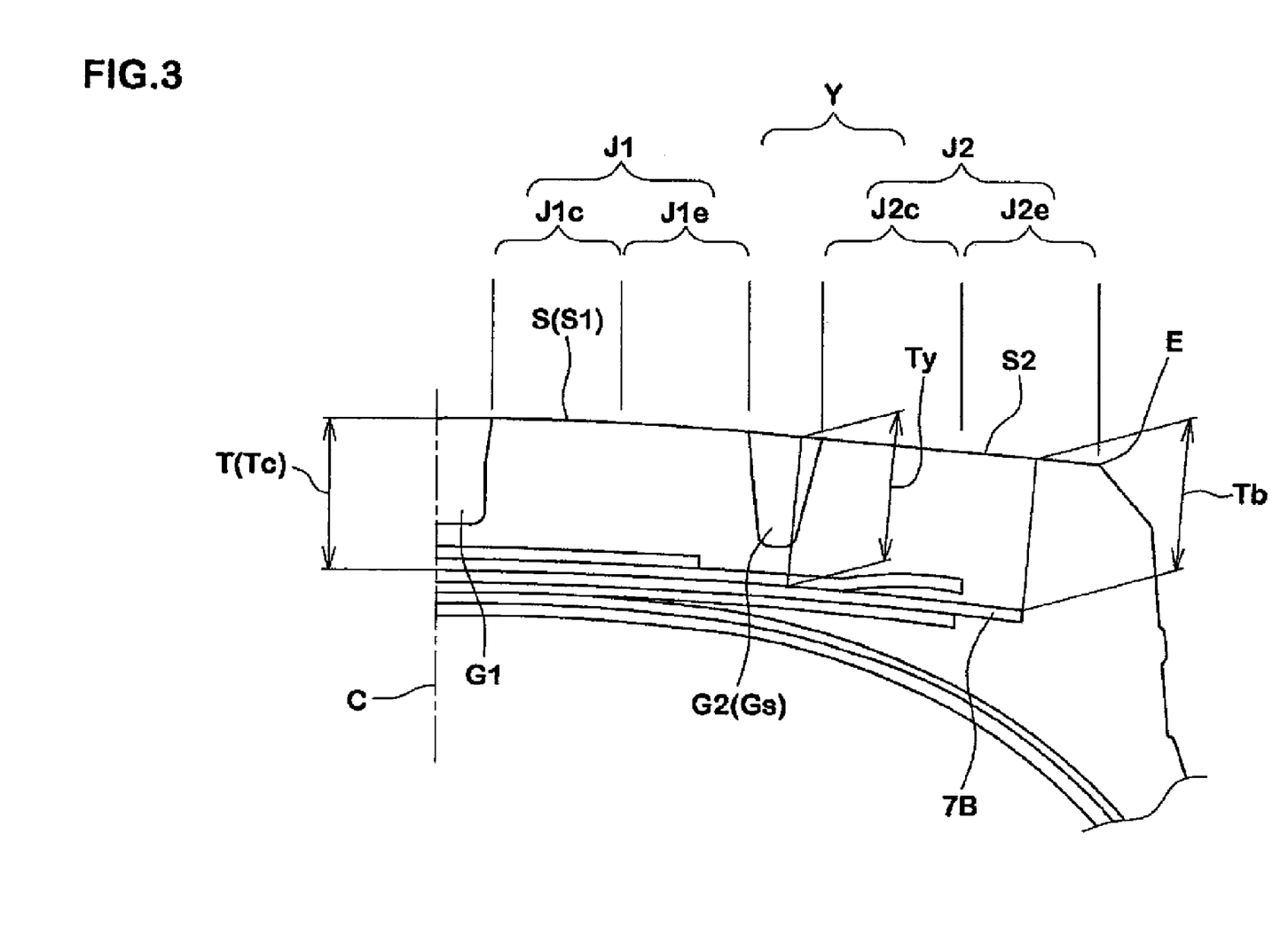
FIG. 3 is an enlarged sectional view of a tread portion of a tire of a second invention.

In the heavy duty tire 1 of the second invention, in order to suppress the uneven wear and equalize the wear in the tread patterns with four ribs like this, the ground-contact length in the normal ground-contact state is specified as follows:

As shown in FIG. 3 in detail, when the inner rib-like land portion J1 is virtually divided into a tire equator side half region J1c and a ground-contact edge side half region J1e, and the outer rib-like land portion J2 is virtually divided into a tire equator side half region J2c and a ground-contact edge side half region J2e, 1) in the inner rib-like land portion J1, a ratio P1e/P1c between an average P1c of the ground-contact force of the tire equator side half region J1c and an average P1e of the ground-contact force of the ground-contact edge side half region J1e is set in a range of 0.8 to 1.0, 2) a ratio P2c/P1e between a total sum P1e of the ground-contact force and a total sum P2c of the ground-contact force applied to the tire equator side half region J2c in the outer rib-like land portion J2 is set in a range of 0.8 to 1.0, and 3) a ratio P2e/P2c between the total sum P2c of the ground-contact load and a total sum P2e of the ground-contact load applied to the ground-contact edge side half region J2e is set in a range of 0.6 to 1.0.

Each total sum P1c, P1e, P2c and P2e can be obtained in the same manner as that of the first invention.

As a result of research of the present inventor, in the case of tread patterns with four ribs, it was found that if the total sums P1c, P1e, P2c and P2e of the ground-contact force are set in the range of the 1) to 3) such that the total sums are uniformly reduced from the tire equator C toward the tread ground-contact edge E (P1c≧P1e≧P2c≧P2e), uneven wear including unbalanced wear could be suppressed and the wear could be equalized.

That is, if the ratio P1e/P1c is limited to 0.8 to 1.0 as shown in 1), uneven wear on the ground-contact edge side in the inner rib-like land portion J1 can be suppressed. If the ratio P2e/P2c is limited to 0.6 to 1.0 as shown in 3), uneven wear on the ground-contact edge side in the outer rib-like land portion J2 can be suppressed. If the ratio P2c/P1e is limited to 0.8 to 1.0 as shown in 2), uneven wear on the tire equator side of the outer rib-like land portion J2 with respect to the inner rib-like land portion J1 can be suppressed.

If the ratio P1e/P1c, ratio P2e/P2c and ratio P2c/P1e are out of the above ranges, balance of wear energies of the half regions J1c to J2e is lost, and uneven wear is generated. Especially in order to enhance the suppressing effect of unbalanced wear, it is preferable that the ratio P2e/P2c is set to 0.7 or higher.

From a point of view of equalization of wear in the entire tread portion 2, it is preferable that the ratio P2e/P1c between the total sum P1c of the ground-contact force and the total sum P2e of the ground-contact force is set in a range of 0.4 to 0.9.

Next, in order to obtain such a distribution of the total sum of the ground-contact force, in this example, when a tread thickness between the profile line S of the tread surface in the regular internal pressure state (tread profile line S, hereinafter) and the second belt ply 7B is defined as T as shown in FIG. 2, a tread thickness Ty in each position in the region Y is set in a range of 0.91 to 1.05 times the tread thickness Tc at the position of the tire equator C, and a tread thickness Tb at the position of the outer end of the second belt ply is set in a range of 0.98 to 1.03 times the tread thickness Tc.

By employing such a distribution of the tread thickness T, it is possible to obtain the distribution of the total sum of the ground-contact force. With this feature, the tread thickness Tb becomes equal to or less than 1.03×Tc, increase in the rubber gauge thickness in the tread shoulder portion Ys can be suppressed, the separation of the end of the belt by the heat of rubber can be prevented, and high endurance can also be ensured.

In this example, in order to obtain the distribution of the tread thickness T, as shown in FIG. 3, the second belt ply 7B is formed of a single arc whose center is on the tire equator C, the tread profile line S in the tread center portion Yc is formed of a projecting arc profile line S1 using a single arc or a plurality of arcs, and the tread profile line S in the tread shoulder portion Ye is formed of a substantially straight profile line S2.

Although the preferred embodiments of the present invention were described above, the invention is not limited to the illustrated embodiments, and can be deformed in various modes.

Embodiment A

Figure 4:
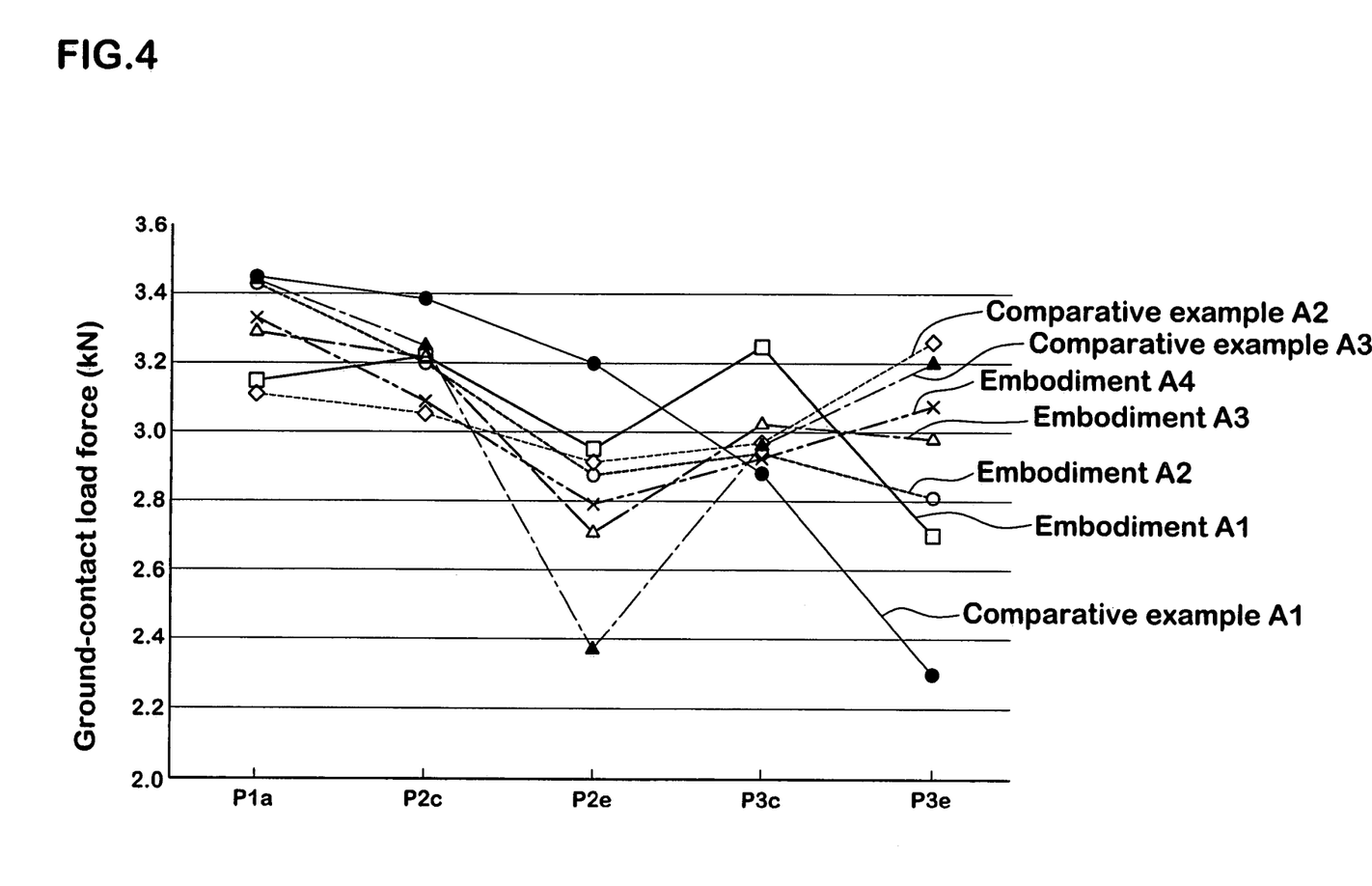
FIG. 4 is a diagram showing a distribution of a total sum of a ground-contact force applied to each half region in Table 1.

The heavy duty tires (tire size is 295/80R22.5) of the first invention having the internal structure shown in FIG. 1 were prototyped based on specs shown in Table 1, and wear of the prototyped tires was tested. A result of the test is shown in Table 1. FIG. 4 is a diagram showing a distribution of the total sum of the ground-contact force applied to each the half region.

(1) Wear;

Rims (22.5×9.00) were assembled to the tread portion, internal pressure (850 kPa) was charged into the tires, and tires were mounted to front wheels of a truck (2-2·D type), the truck was allowed to run through a distance of 100,000 km. In the tires after running, the wear amounts of the following positions were measured:

a side edge position j1 in the ground-contact edge-side of the inner rib-like land portion R1, a side edge position j2 in the tire equator-side of the intermediate rib-like land portion R2, a side edge position j3 in the ground-contact edge-side of the intermediate rib-like land portion R2, a side edge position j4 in the tire equator-side of the outer rib-like land portion R3, and a side edge position j5 in the ground-contact edge-side of the outer rib-like land portion R3 (corresponding to the ground-contact edge E).

The wear amount are indicated while a comparative example 1 is defined as 100. The smaller the value, the smaller the wear amount is.

TABLE 1

|  | Embodiment A1 | Embodiment A2 | Embodiment A3 | Embodiment A4 | Comparative example A1 | Comparative example A2 | Comparative example A3 |
| --- | --- | --- | --- | --- | --- | --- | --- |
| Tread ground-contact width WT <mm> | 240 | 240 | 240 | 240 | 240 | 240 | 240 |
| Width WB of belt ply (mm) | 220 | 220 | 220 | 220 | 220 | 220 | 220 |
| Ground-contact force (KN) | | | | | | | |
| P1a | 3.14 | 3.43 | 3.30 | 3.33 | 3.45 | 3.11 | 3.45 |
| P2c | 3.22 | 3.19 | 3.22 | 3.10 | 3.38 | 3.06 | 3.25 |
| P2e | 2.94 | 2.87 | 2.71 | 2.79 | 3.21 | 2.90 | 2.37 |
| P3c | 3.24 | 2.93 | 3.03 | 2.94 | 2.89 | 2.90 | 2.96 |
| P3e | 2.7 | 2.81 | 2.98 | 3.08 | 2.31 | 3.27 | 3.20 |
| Total | 15.24 | 15.24 | 15.24 | 15.24 | 15.24 | 15.24 | 15.24 |
| Ratio of ground-contact force | | | | | | | |
| P2c/P1a | 1.03 | 0.93 | 0.98 | 0.93 | 0.98 | 0.98 | 0.94 |
| P2e/P2c | 0.91 | 0.90 | 0.84 | 0.90 | 0.95 | 0.95 | 0.73 |
| P3c/P2e | 1.10 | 1.02 | 1.12 | 1.05 | 0.90 | 1.00 | 1.25 |
| P3e/P3c | 0.83 | 0.96 | 0.98 | 1.05 | 0.80 | 1.13 | 1.08 |
| P3e/P1a | 0.86 | 0.82 | 0.90 | 0.93 | 0.67 | 1.05 | 0.93 |

TABLE 1-continued

|  | Embodiment A1 | Embodiment A2 | Embodiment A3 | Embodiment A4 | Comparative example A1 | Comparative example A2 | Comparative example A3 |
|---|---|---|---|---|---|---|---|
| Tread thickness T <mm> | | | | | | | |
| Tmin (*1) | 22.75 | 23.5 | 23.5 | 23.5 | 25 | 23.5 | 22.0 |
| Tc | 25 | 25 | 25 | 25 | 25 | 25 | 25 |
| Tb | 25 | 24.25 | 25.25 | 26.75 | 25 | 28.75 | 25 |
| (Ratio Tmin/Tc) | 0.91 | 94 | 0.94 | 0.94 | 1 | 0.94 | 0.88 |
| (Ratio Tb/Tc) | 1 | 0.97 | 1.01 | 1.07 | 1 | 1.15 | 1 |
| Wear | | | | | | | |
| Wear amount (position j1) | 100 | 100 | 100 | 100 | 100 | 100 | 105 |
| Wear amount (position j2) | 100 | 99 | 100 | 100 | 100 | 105 | 110 |
| Wear amount (position j3) | 100 | 98 | 99 | 100 | 100 | 105 | 95 |
| Wear amount (position j4) | 95 | 96 | 96 | 95 | 100 | 100 | 95 |
| Wear amount (position j5) | 87 | 90 | 85 | 80 | 100 | 90 | 95 |

(*1) A distance from the tire equator to the smallest tread thickness position Qt is 0.55 times the half of the tread ground-contact width: WT/2.
(Others)
Distances from the tire equator to groove center lines of the inner and outer longitudinal main grooves are 0.175 times and 0.558 times the half of the tread ground-contact width: WT/2, respectively.
The radius of curvature of the belt ply is 580 mm.

Embodiment B

Figure 5:
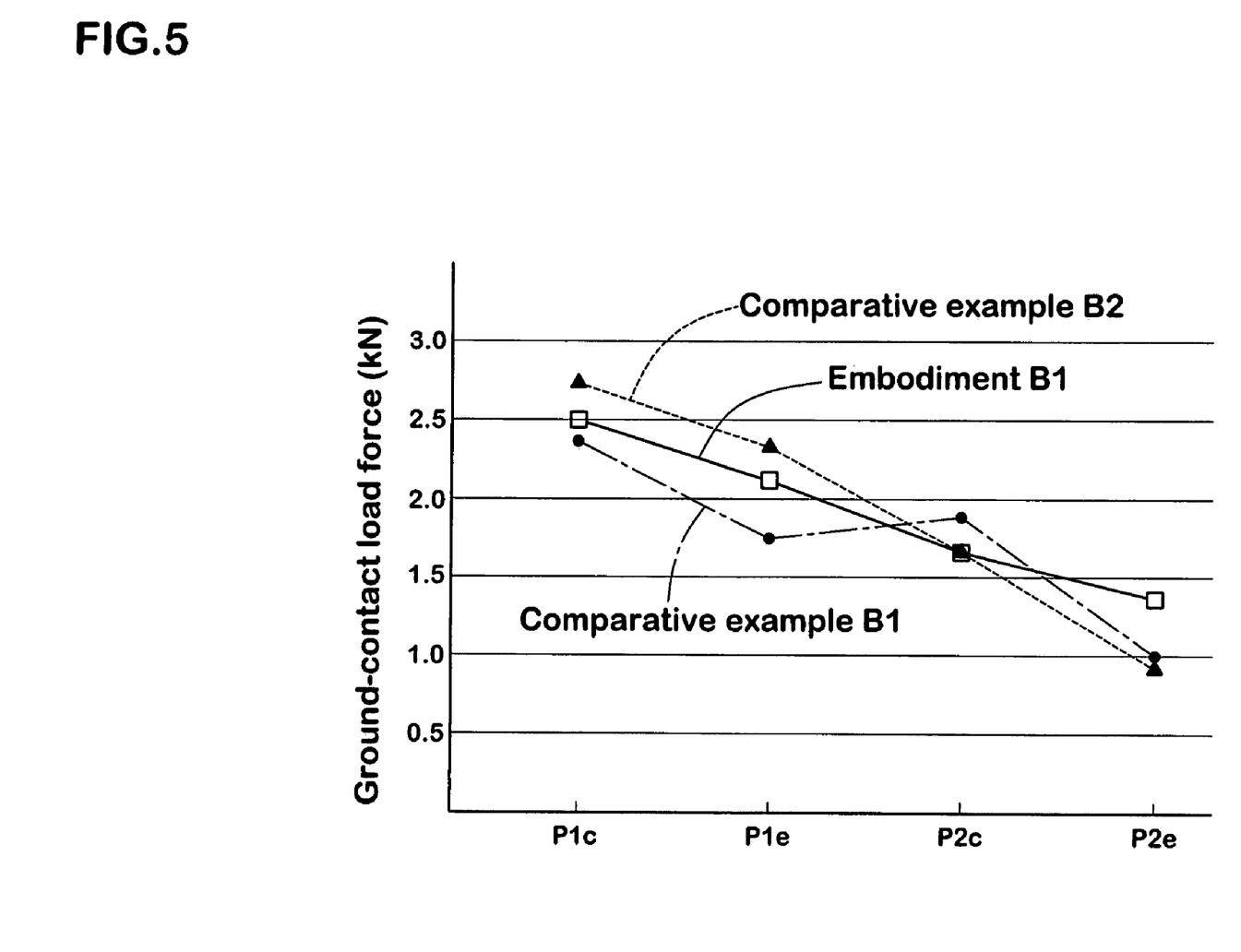
FIG. 5 is a diagram showing a distribution of a total sum of a ground-contact force applied to each half region in Table 2.

The heavy duty tires (tire size is 11R22.5) of the second invention having the internal structure shown in FIG. 2 were prototyped based on specs shown in Table 2, and wear of the prototyped tires was tested. A result of the test is shown in Table 2. FIG. 5 is a diagram showing a distribution of the total sum of the ground-contact force applied to each half region in the embodiment B1 and the comparative examples B1 and B2.

(1) Wear;

Rims (22.5×7.50) were assembled to the tread portion, internal pressure (800 kPa) was charged into the tires, and tires were mounted to front wheels of a truck (2-2·D type), the truck was allowed to run through a distance of 10,000 km. In the tires after running, (a) a wear amount Z1 in the center longitudinal main groove G1 and a wear amount Z2 in the outer longitudinal main groove G2 (shoulder groove Gs) were measured, and ratios Z1/Z2 were compared. If the ratio Z1/Z2 is greater than 1.0, there is a tendency that center wear is generated, and if the ratio z1/z2 is smaller than 1.0, there is a tendency that shoulder wear is generated, and if the ratio Z1/Z2 is closer to 1.0, the equalization of wear is more excellent. The wear amount Z1 is an average value of the wear amount in both groove-side edges of the center longitudinal main groove G1, and the wear amount Z2 is an average value in both the groove-side edges of the outer longitudinal main groove G2.

Figure 6:
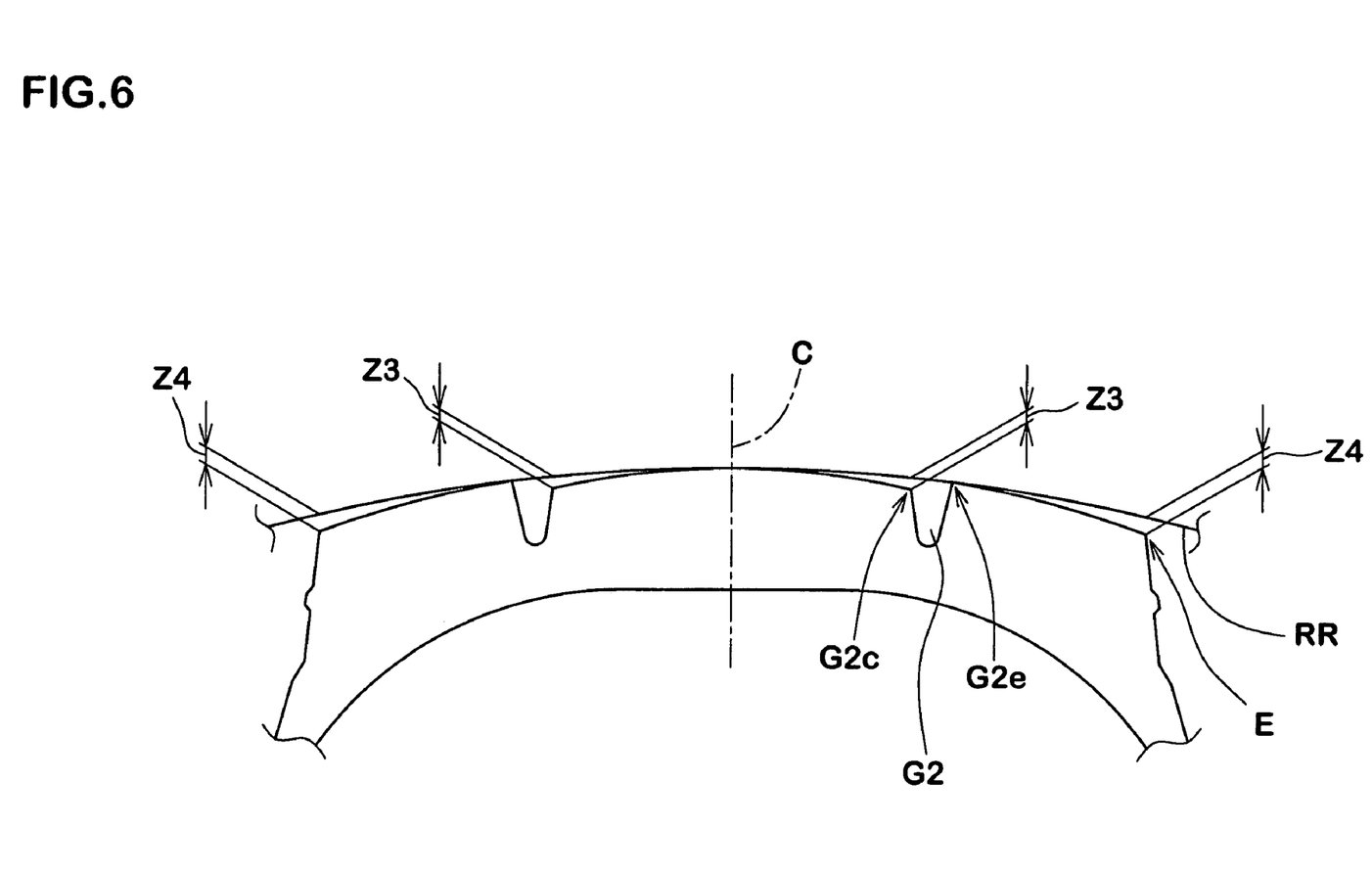
FIG. 6 is a diagram for explaining an evaluation method of orbital wear and unbalanced wear.

(b) As shown in FIG. 6, a drop amount Z3 of the side edge G2c in the tire equator-side of the outer longitudinal main groove G2 with respect to a reference arc RR passing through the tire equator C and the side edges G2e and G2e in the ground-contact edge-side of the outer longitudinal main groove G2 was measured and compared. The greater the value, the orbital wear is greater. A drop amount Z4 of the tread ground-contact edge E with respect to the reference arc RR was measured and compared. The greater the value, the greater the unbalanced wear is.

TABLE 2

|  | Embodiment B1 | Embodiment B2 | Comparative example B1 | Comparative example B2 |
|---|---|---|---|---|
| Tread ground-contact width WT <mm> | 225 | 225 | 201 | 225 |
| Width WB of belt ply <mm> | 200 | 200 | 192 | 188 |
| Ratio of ground-contact force | | | | |
| P1e/P1c | 0.844 | 0.868 | 0.743 | 0.859 |
| P2e/P2c | 0.789 | 0.697 | 0.557 | 0.559 |
| P2c/P1e | 0.801 | 0.809 | 1.060 | 0.720 |
| Tread thickness T | | | | |
| Ty(*1) | 25 | 26.1 | 26.33 | 26.95 |
| Tc | 25 | 25 | 25 | 25 |
| Tb | 25.73 | 25.55 | 26.85 | 26.73 |

TABLE 2-continued

|  | Embodiment B1 | Embodiment B2 | Comparative example B1 | Comparative example B2 |
|---|---|---|---|---|
| (Ratio Ty/Tc) | 1.000 | 1.044 | 1.053 | 1.078 |
| (Ratio Tb/Tc) | 1.029 | 1.022 | 1.074 | 1.069 |
| Wear |  |  |  |  |
| Ratio Z1/Z2 | 1.15 | 1.44 | 1.19 | 1.05 |
| Z3 | 0.0 | 0.0 | 2.0 | 0.5 |
| Z4 | 1.5 | 2.0 | 5.0 | 3.5 |

*1 Measured at a position separated away from the tire equator by a distance of 0.6 times the half of the tread ground-contact width: WT/2.
* (Others)
A distance from the tire equator to the groove center line of the outer longitudinal main groove is 0.54 times the half of the tread ground-contact width: WT/2, and a groove width is 12 mm.
A radius of curvature of the belt ply is 580 mm.

As shown in Tables 1 and 2, according to each of the tires of the embodiments of the first and second inventions, when a normal load is applied to the tire in its regular internal pressure state, in the total sum of the ground-contact force applied to the tire equator side half region and the ground-contact edge side half region, each of which being the rib-like land portions, since the ratio of the total sum of the ground-contact force between the axially adjacent half regions is specified, it is possible to suppress the uneven wear including the unbalanced wear and to equalize the wear without excessively increasing the rubber gauge thickness.

INDUSTRIAL APPLICABILITY

Since the heavy duty tire of the present invention has the above-described structure, it is possible to suppress the uneven wear including the unbalanced wear and to equalize the wear without excessively increasing the rubber gauge thickness.

The invention claimed is:

1. A heavy duty tire comprising a carcass extending from a tread portion to a bead core of a bead portion through a sidewall portion, and a belt layer disposed inside the tread portion and outside the carcass, wherein
the belt layer includes a carcass-side first belt ply and a second belt ply disposed outside thereof, and
when the tread thickness between the profile line of the tread surface and the second belt ply is defined as T, a tread thickness Ty in a region Y the boundaries of which are separated from the tire equator C by distances of 0.5 and 0.7 times the half of the ground-contact width of the tread is set in the range of 1.00 to 1.05 times the tread thickness Tc at a position of the tire equator C, and the tread thickness Tb at the position of the outer end of the second belt ply is set in a range of 0.98 to 1.03 times the tread thickness Tc,
the tread portion is divided by three longitudinal main grooves extending in a circumferential direction of the tire into inner rib-like land portions J1 on each side of the tire equator and ground-contact edge-side outer rib-like land portions J2, and each longitudinal main groove between the inner rib-like land portion J1 and the outer rib-like land portion J2 is located in said region Y,
in a regular ground-contact state in which the tire is mounted on the regular rim, the regular internal pressure is charged into the tire and the normal load is applied to the tire,
a ratio P1e/P1c between a total sum of ground-contact forces P1c applied to a tire equator-side half region J1c in the inner rib-like land portion J1 and a total sum of ground-contact forces P1e applied to a ground-contact edge-side half region J1e is set in a range of 0.8 to 1.0,
a ratio P2c/P1e between the total sum of ground-contact forces P1e and a total sum of ground-contact forces P2c applied to a tire equator side half region J2c in the outer rib-like land portion J2 is set in a range of 0.8 to 1.0,
a ratio P2e/P2c between the total sum of ground-contact forces P2c and a total sum of ground-contact forces P2e applied to a ground-contact edge side half region J2e in the outer rib-like land portion J2 is set in a range of 0.6 to 1.0, wherein the total sums P1c, P1e, P2c and P2e have a relationship of P1c>P1e>P2c>P2e, and
a ratio P2e/P1c between the total sum of ground-contact forces P1c and the total sum of ground-contact forces P2e is set in a range of 0,4 to 0.9.

* * * * *